3,558,509
MEANS FOR RAISING THE AUTOGENOUS IGNITION TEMPERATURE OF CARBON DISULFIDE

Tadeusz K. Wiewiorowski, New Orleans, and David J. Miller, Gretna, La., assignors to Freeport Sulphur Company, New York, N.Y., a corporation of Delaware
No Drawing. Filed Jan. 23, 1967, Ser. No. 610,831
Int. Cl. C23g 5/02; E21b 43/00
U.S. Cl. 252—364          17 Claims

ABSTRACT OF THE DISCLOSURE

The autogenous ignition temperature of carbon disulfide can be elevated above that of pure carbon disulfide by incorporating an amount of from about 0.1% to about 10% by weight, preferably between about 0.2% and 5%, of an additive selected from the class consisting of dimethyl sulfoxide and organic sulfides and disulfides having the formulae RSR' and RSSR', respectively, wherein R and R' are alkyl or alkenyl radicals each containing up to about 5 carbon atoms, inclusive.

---

This invention relates to the art of raising the autogenous ignition temperature of carbon disulfide. More specifically, the invention relates to compositions comprising carbon disulfide and a minor amount of an additive, in which the composition has an autogenous ignition temperature substantially above that of carbon disulfide alone. The invention also relates to methods for elevating the autogenous ignition temperature of carbon disulfide.

The advantage of the compositions of the invention resides primarily in increasing the safety of handling and using carbon disulfide, a common industrial solvent. Carbon disulfide is used as an industrial solvent in a wide variety of applications. It is used for dissolving residues from oil well casings and pipelines, for unplugging sour gas wells obstructed by elemental sulfur, as a solvent in emulsion polymerization and in the production of nitrocellulose and polyvinyls, as well as many other uses.

The major drawback in the use of carbon disulfide is its extremely low autogenous ignition temperature. If carbon disulfide comes into contact with a surface whose temperature is 100° C. or above, it will burst into flames. Consequently, the handling of carbon disulfide is hazardous and requires special precautions.

There are compounds, which when added to carbon disulfide, are capable of raising the autogenous ignition temperature of carbon disulfide. Thus, when 20 percent by volume of carbon tetrachloride is added to carbon disulfide, the autogenous ignition temperature of the mixture is raised to 141.6° C., as compared to 100° C. for pure carbon disulfide, as reported in "$CS_2$", published by Stauffer Chemical Company, 1964, page 18.

A disadvantage of the previously known methods of raising the autogenous ignition temperature of carbon disulfide lies in the fact that relatively large amounts of additives must be added to the carbon disulfide. The use of such large amounts of additives results in decreasing the effectiveness of the carbon disulfide as a solvent and frequently raises the cost of the product inordinately.

Many additives have been tried for the purpose of elevating the autogenous ignition temperature of carbon disulfide, without success. These include the carboxylic acids, organic amines, ketones, benzene, water, nitrobenzene, methyl mercaptan, sulfur dioxide and many others. Thus when additives were found which in small amounts successfully elevate the autogenous ignition temperature of carbon disulfide, it was unexpected.

It is, accordingly, an object of this invention to provide new and useful compositions and methods for raising the autogenous ignition temperature of carbon disulfide.

It is another object of this invention to minimize the loss of solvent power of carbon disulfide while raising its autogenous ignition temperature.

It is also an object of this invention to provide additives which, when dissolved in small concentrations in carbon disulfide, effectively raise its autogenous ignition temperature.

It is a further object of this invention to provide a composition of matter which has essentially all of the useful characteristics of carbon disulfide, but is less hazardous to handle.

Other objects of the invention will be apparent to those skilled in the art from reading the present description.

This invention provides new, convenient and useful compositions comprising a major proportion of carbon disulfide which have an autogenous ignition temperature substantially greater than that of carbon disulfide. The invention provides a novel and convenient method for elevating the autogenous ignition temperature of carbon disulfide. It has been found, surprisingly, that substances, which belong to the class defined below, when added to carbon disulfide significantly raise its autogenous ignition temperature. The additives suitable in the practice of this invention belong to the class of substances consisting of:

(A) Organic sulfides and disulfides with the formulae RSR' and RSSR', respectively, wherein R and R' are alkyl or alkenyl radicals each containing up to about 5 carbon atoms, inclusive, including such radicals as methyl, ethyl, n-propyl, isopropyl, n-butyl, isobutyl, tert.-butyl, isopentyl, n-pentyl, and allyl, etc. R and R' need not be the same.

(B) Dimethyl sulfoxide

The objects of this invention may be achieved by introducing one or more of the above-described additives directly into liquid or vaporized carbon disulfide. The amount of additive used should be between about 0.1% and 10% by weight, and preferably between about 0.2% and 5% by weight. The additive chosen and the amount used may be varied depending on the particular requirements for the properties of the carbon disulfide. For example, if a relatively high autogenous ignition temperature is desired, a relatively large amount of additive should be employed. The additives may be used singly or in combination.

The preferred embodiment of this invention involves dissolving about 0.4% by weight of liquid dimethyl disulfide in liquid carbon disulfide. The resulting solution has an autogenous ignition temperature of about 190° C. and solvent properties essentially identical with those of pure carbon disulfide.

The method for raising the autogenous ignition temperature of carbon disulfide of the present invention offers several distinct advantages over prior art. In contrast to the prior art, only relatively small amounts of the additive need be used to give significant changes in the autogenous ignition temperature. As a result, the solvent power of the carbon disulfide remains essentially unchanged.

In order more clearly to disclose the nature of the present invention, the following specific illustrative examples will be set forth. It should be understood, however, that this is done solely by way of example and is intended neither to delineate the scope of the invention nor limit the ambit of the appended claims. Parts are expressed in terms of parts by weight. Autogenous ignition temperatures as referred to herein were determined by the ASTM Method No. D296–58T, as described in the "1958 Book of ASTM Standards," Part 7, American Society for Testing Materials, Philadelphia, Pa. p. 161.

EXAMPLE 1

0.21 grams of liquid dimethyl disulfide was added to 100 grams of liquid carbon disulfide. The autogenous ignition temperature of the solution was found to be about 150° C., instead of 100° C. for pure carbon disulfide.

EXAMPLES 2-6

The test of Example 1 was repeated, except the amount of dimethyl disulfide added was varied. The autogenous ignition temperatures are recorded in Table 1 below:

TABLE I

| Example: | Grams of dimethyl disulfide added | Autogenous ignition temperature, °C. |
|---|---|---|
| 2 | 0.0 | 100 |
| 3 | 0.042 | 113 |
| 4 | 0.11 | 128 |
| 5 | 0.32 | 171 |
| 6 | 0.42 | 190 |

EXAMPLES 7-12

Other additives were tested for their effect on the autogenous ignition temperature of carbon disulfide and the results are presented in Table II, below:

TABLE II

| Example | Additive | Percent by weight of additive | Autogenous ignition temperature, °C. |
|---|---|---|---|
| 7 | Dimethyl sulfoxide | 1.0 | >150 |
| 8 | Diethyl disulfide | 0.5 | >150 |
| 9 | Ethyl sulfide | 1.0 | >150 |
| 10 | Methyl sulfide | 0.50 | >150 |
| 11 | Di-tert. butyl disulfide | 0.50 | >150 |
| 12 | Tert. butyl sulfide | 1.00 | >150 |

The terms and expressions which have been employed are used as terms of description and not of limitation, and there is no intention in the use of such terms and experssions of excluding any equivalents of the features shown and described or portions thereof, but it is recognized that various modifications are possible within the scope of the invention claimed.

What is claimed is:

1. A composition having an autogenous ignition temperature greater than that of pure carbon disulfide consisting essentially of carbon disulfide containing from about 0.1% up to about 10% by weight of an additive selected from the class consisting of organic sulfides and disulfides of the formula RSR' and RSSR', respectively, wherein R and R' are radicals selected from the class consisting of alkyl and alkenyl each containing up to about 5 carbon atoms, inclusive.

2. A composition according to claim 1 wherein the additive is dimethyl disulfide.

3. A composition according to claim 1 wherein the additive is diethyl disulfide.

4. A composition according to claim 1 wherein the additive is ethyl sulfide.

5. A composition according to claim 1 wherein the additive is methyl sulfide.

6. A composition according to claim 1 wherein the additive is di-tert. butyl disulfide.

7. A composition according to claim 1 wherein the additive is tert. butyl sulfide.

8. A composition according to claim 1 wherein the additive is present in an amount of between about 0.2% and 5% by weight.

9. A method of elevating the autogenous ignition temperature of carbon disulfied which comprises adding to the carbon disulfide from about 0.1% up to about 10% by weight of an additive selected from the class consisting of dimethyl sulfoxide and organic sulfides and disulfides of the formulae RSR' and RSSR', respectively, wherein R and R' are radicals selected from the class consisting of alkyl and alkenyl each containing up to about 5 carbon atoms, inclusive.

10. A method according to claim 9 wherein the additive is dimethyl sulfoxide.

11. A method according to claim 9 wherein the additive is dimethyl disulfide.

12. A method according to claim 9 wherein the additive is diethyl disulfide.

13. A method according to claim 9 wherein the additive is ethyl sulfide.

14. A method according to claim 9 wherein the additive is methyl sulfide.

15. A method according to claim 9 wherein the additive is di-tert. butyl disulfide.

16. A method according to claim 9 wherein the additive is tert. butyl sulfide.

17. A method according to claim 9 wherein the additive is added in an amount of between about 0.2% and 5% by weight.

References Cited

UNITED STATES PATENTS 3,402,770　9/1968　Messenger _____ 166—40

HERBERT B. GUYNN, Primary Examiner

U.S. Cl. X.R.

23—206; 166—304; 252—8.55

UNITED STATES PATENT OFFICE
CERTIFICATE OF CORRECTION

Patent No. 3,558,509                  Dated January 26, 1971

Inventor(s) Tadeusz K. Wiewiorowski and David J. Miller

It is certified that error appears in the above-identified patent and that said Letters Patent are hereby corrected as shown below:

Column 2, line 69, "No. D296-58T" should be --No. D286-58T--

Column 3, line 41, the word "experssions" should be --expressions--.

Column 4, line 19, the word "disulfied" should be --disulfide--.

Signed and sealed this 27th day of April 1971.

(SEAL)
Attest:

EDWARD M. FLETCHER, JR.
Attesting Officer

WILLIAM E. SCHUYLER
Commissioner of Pat